United States Patent Office 3,444,107
Patented May 13, 1969

3,444,107
PROCESS OF FOAMING A POLYMERIZABLE CYCLIC VINYL ETHER COMPOSITION
David Jankiel Wluka, East St. Kilda, Victoria, Australia, assignor to Imperial Chemical Industries of Australia and New Zealand Limited, Melbourne, Victoria, Australia, a company of Victoria, Australia
No Drawing. Filed Sept. 19, 1966, Ser. No. 580,180
Claims priority, application Australia, Sept. 17, 1965, 64,184/65
Int. Cl. C08f 47/08, 29/30
U.S. Cl. 260—2.5          7 Claims

ABSTRACT OF THE DISCLOSURE

Foamed polyvinyl ether compositions and a process for producing the same which includes foaming at least one polymerizable cyclic vinyl ether containing at least two vinyl groups per molecule in the presence of a foaming agent, an acidic catalyst and a pore-size controlling additive. The pore-size controlling additive is a copolymer of at least one unsaturated compound A and at least one compound B being a derivative of a mono- or diprotic unsaturated acid which is copolymerizable with compound A and one or both of compounds A and B carrying at least one aliphatic substituent having at least 4 carbon atoms and at least one of compounds A and B carrying at least one polyoxyalkylene residue terminated with an alkyl, aryl, aralkyl, alkaryl or acyl group.

---

The present invention relates to a new composition comprising copolymers of polyoxyalkylene derivatives of unsaturated acids and in particular to plastic foaming compositions comprising these copolymers.

Accordingly we provide new foaming compositions based on polymerisable vinyl ethers which compositions comprise a pore size controlling agent which is a copolymer of at least one unsaturated compound A and a copolymerisable derivative B of a mono- or diprotic unsaturated acid at least one of which compounds A and B comprises one or more aliphatic groups of 4 or more carbon atoms and at least one of which compounds A and B comprises one or more polyoxyalkylene residues terminated by an alkyl, aryl, aralkyl, alkaryl or acyl group.

The compound A may be represented by the formula $$R^3.C.R^4$$
$$R^3.\overset{\|}{C}.Y^1_a\text{---}G^1_b\text{---}R^1 \qquad \text{(Formula A)}$$

In Formula A, indices $a$ and $b$, which may be the same or different, are 0 or 1; $Y^1$ which may be present (when $a=1$) or absent (when $a=0$) is an alkylene bridge; —$G^1$—which may be present (when $b=1$) or absent (when $b=0$) is —O—,

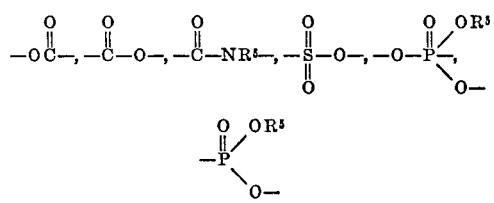

$R^2$, $R^3$ and $R^4$, which may be the same or different and at least one of which is hydrogen, and not more than one of which is aryl or cycloalkyl, stand for hydrogen or a hydrocarbon radical. In addition, whenever —$G^1R^1$ stands for

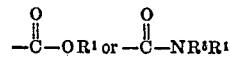

$R^2$ may also stand for

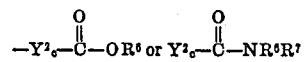

and whenever $a=0$ and —$G^1R^1$ stands for

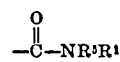

$R^2$ may also stand for

and $R^5$ then stands for a direct bond to the latter thus forming an imide of a dicarboxylic acid having the formula

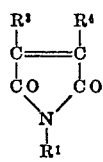

$Y^2$ is an alkylene bridge and index $c$ is 0 or 1. Furthermore whenever $R^2$ and $R^4$ stand for hydrogen, $R^3$ may also stand for —$CH_2CONR^8R^9$ or —$CH_2 \cdot COOR^9$. $R^1$, $R^5$, $R^6$, $R^7$, $R^8$ and $R^9$, which may be the same or different, are hydrocarbon radicals. Each hydrocarbon radical is selected from the group consisting of alkyl, alkenyl, cycloalkyl, aryl, alkaryl and aralkyl; they are illustrated by radicals such as methyl, ethyl, isopropyl, 2-ethylhexyl, cyclohexyl, hexyl, allyl, hexenyl, phenyl, benzyl, phenylethyl, naphthyl, tertiary butyl, etc. Preferred $G^1R^1$ is

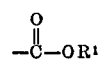

preferred $Y^1$ is —$CH_2$—; preferably at least one hydrocarbon $R^1$, $R^5$, $R^6$, $R^7$, $R^8$, or $R^9$ is a long chain alkyl group which is defined as a group comprising at least 4, more preferably at least 8 and most preferably at least 12 carbon atoms; preferred $R^2$, $R^3$ and $R^4$ are hydrogen or alkyl groups having 1 to 3 carbons.

Suitable monomers comprising at least one preferred long chain alkyl group are e.g.

Olefines:
 hexene-1
 octene-1
 decene-1
 diisobutene-1
 dodecene-1
 hexadecene-1
 octadecene-1
 3-phenylhexadecene-1
 p-octylstyrene
 2-hexadecylbutadiene-1,3

Ethers:
- allyl 4,4,8,8-tetramethyldocosyl ether
- methallyl octadecyl ether
- isopropenyl dodecyl ether
- dodecyl vinyl ether
- cetyl vinyl ether
- 1-eicosenyl decyl ether
- vinyl p-octylphenyl ether
- 1-decenyl p-cetylphenyl ether Esters:
- vinyl butyrate
- vinyl 2-ethylhexanoate
- vinyl palmitate
- vinyl oleate
- allyl oleate
- allyl palmitate
- allyl stearate
- allyl esters of lard acids
- methallyl palmitate
- cyclohexyl 2-dodecenoate
- p-isoamylphenyl 2-hexadecenoate
- 4-p-butyltoyl 2-octadecenoate
- 5-ethyldocosyl crotonate
- octadecyl isocrotonate
- n-butyl-2-eicosenoate
- p-tert. amylphenyl octadecyl maleate
- p-hexadecylphenyl 2-ethyl-hexyl maleate
- o-tolyl 2-octadecylcyclohexyl maleate
- o-nonylphenyl-hexadecyl maleate
- dihexadecyl maleate
- n-butyl acrylate
- lauryl acrylate
- stearyl acrylate
- dodecyl acrylate
- dihexyl fumarate
- dioctyl fumarate
- di-dodecyl maleate
- di-dodecyl mesaconate
- di-dodecyl citraconate
- benzyl octadecyl itaconate
- di-hexadecyl itaconate
- isopropenyl palmitoleate
- 1-decenyl laurate
- 1-hexadecenyl myristate allyl lauryl prop-2-enyl phosphonate The copolymerisable derivative B of a mono- or diprotic, unsaturated acid may be presented by the formula:

$$R^{12}-C-R^{13}$$
$$R^{11}-C-Y_p{}^3-G^2-ZXR^{10} \quad \text{(Formula B)}$$

In Formula B, $G^2$ is

Whenever —$G^2$— stands for

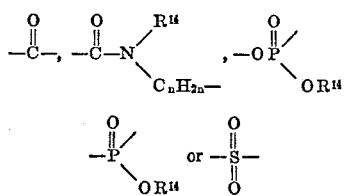

$R^{13}$ may also stand for

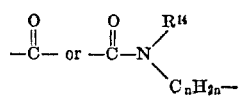

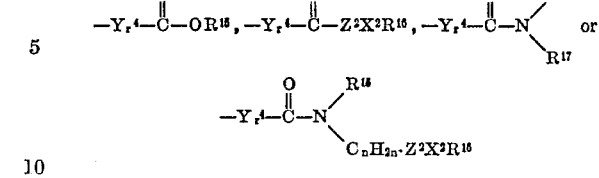

furthermore when —$Y_p{}^3$—$G^2$ stands for

$R^{13}$ may be

and $R^{14}$ is then a direct bond linking the latter to form a cyclic imide of the formula

Indices $p$ and $r$, which may be the same or different, are 0 or 1, i.e. $Y^3$ and $Y^4$ may be absent or present; index $n$ is an integer from 1 to 5, e.g. two or three; $Y^3$ and $Y^4$, which may be the same or different, are alkylene bridges; $Z$ and $Z^2$, which may be the same or different, are polyoxyalkylene residues $(OC_mH_{2m})_q$ more closely defined below, each of which may be a linear or branched homopolymer, a random copolymer or a block copolymer optionally modified by grafting a polyvinyl ester or polymethacrylic ester homopolymer or copolymer on to said polyoxyalkylene residue. $X$ and $X^2$, which may be the same or different, stand for —O— or —$NR^{18}$—; $R^{14}$, $R^{15}$, $R^{17}$, $R^{18}$, $R^{19}$ and $R^{20}$, which may be the same or different, are hydrocarbon radicals; $R^{11}$, $R^{12}$ and $R^{13}$, which may be the same or different, are hydrogen or hydrocarbon radicals, provided however that at least one of them is hydrogen and not more than one of them is aryl or cycloalkyl; $R^{10}$ and $R^{16}$ are alkyl, aryl, cycloalkyl, aralkyl, alkaryl or acyl groups and whenever $R^{12}$ and $R^{13}$ are hydrogen, $R^{11}$ may also be —$CH_2COOR^{19}$, —$CH_2 \cdot CONR^{19}R^{20}$, —$CH_2COOZ^2X^2R^{16}$ or

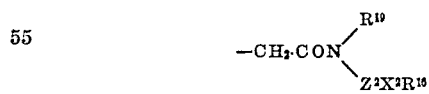

Preferred hydrocarbon radicals are the $C_1$ to $C_3$ alkyl radicals; preferred group $R^{12}$ is hydrogen and preferred $R^{11}$ is hydrogen or methyl, preferred $G^2$ is

and $Y^3$ is preferably —$CH_2$— or absent.

For any combination of co-mers A and B at least one of the hydrocarbon radicals $R^1$, $R^5$, $R^6$, $R^7$, $R^8$, $R^9$, $R^{10}$, $R^{14}$, $R^{15}$, $R^{17}$, $R^{18}$, $R^{19}$ and $R^{20}$ must be a long chain alkyl radical as above defined. While the presence of at least one such long chain alkyl group is essential to our invention in that it imparts the non-polar properties to the copolymers, the choice of the other radicals, of $G^1$ and of the optional alkylene bridges $Y^1$ and $Y^2$ is not highly critical; it is largely a matter of convenience; thus certain of the compounds within the scope of formulae A and B are operative but less readily synthesised and/or polymerised while others are commercially available monomers.

The —$XR^{10}$ group may be for example an alkoxy radical such as methoxy, ethoxy, propoxy, butoxy, octyloxy, octadecyloxy; a cycloalkoxy or arylalkoxy radical such as cyclohexyloxy, benzyloxy; an aryloxy radical such as phenoxy; an amine residue such as dimethylamino, diethylamino, phenylmethylamino, morpholino; or a carboxylic acid residue such as acetyloxy, benzoyloxy or an amide residue such as N-methylbenzamido or N-methylacetamido.

Suitable $\alpha$-$\beta$ unsaturated monocarboxylic acids from which esters containing the Z group or the long chain alkyl group $R^1$ may be formed are e.g. acids of the general formula

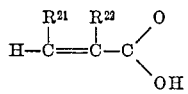

where $R^{21}$ and $R^{22}$, which may be the same or different, are H or an alkyl group having 1 to 4 carbons. Representative acids of this type, any one or more of which can be employed in forming the copolymers, are acrylic, methacrylic, crotonic tiglic, angelic, $\alpha$-ethylacrylic, $\alpha$-methylcrotonic, $\alpha$-ethylcrotonic, $\alpha$-propylcrotonic, $\alpha$-butylcrotonic, hydrosorbic, $\alpha$-ethylhydrosorbic and $\alpha$-propylhydrosorbic acids, and the like. A more preferred group of acids for use in the present invention comprises those of the above formula which contain a total of from about 3 to 8 carbon atoms in the molecule, as represented by all except the last-named of the acids listed above. A still more preferred group of acids is made up of acrylic and methacrylic acids.

$\alpha$-$\beta$ Unsaturated dicarboxylic acids suitable for making di-esters or -amides or esteramides comprising a long chain alkyl group or a group —$ZXR^{10}$ containing the polyalkylene oxide residue Z as defined include maleic, fumaric, itaconic, citraconic, mesaconic acids. A preferred group of dicarboxylic acids comprises those which contain a total of from about 4 to 8 carbon atoms in the molecule. Still more preferred are maleic acid and fumaric acid.

Suitable proportions of polyoxyalkylene residues range from 15 to 70 precent of the total weight of the copolymeric additive; for best performance the narrower range from 25 to 50% by weight as defined above is preferred; when the polyoxyalkylene group consists of different units $(OC_mH_{2m})$, polyoxyalkylene residues consisting of 50% or more of ethylene oxide units are preferred within the above stated ranges; when the polyoxyalkylene group comprises 70% or more of propylene oxide or butylene oxide units or combinations thereof, it is preferred that the weight of the polyoxyalkylene group is between 40 and 70% of the copolymeric additive. It is understood that within small changes of ratios of the various constituents the improvement in foam properties is gradual and depends also on the specific base polymer ingredients used; hence these limits are not acutely or abruptly critical.

Suitable proportions of the long chain alkyl range from 10 to 60% and, for best performance, from 20 to 50% by weight of the copolymeric additive.

In practice particularly effective and economic pairs of copolymers A and B are the copolymers of methacrylates and fumarates comprising in each pair at least one long chain alkyl group as defined and an ester of a polyalkyleneglycol group —$ZXR^{10}$ as defined. Other effective and economic combinations are the copolymers of a long chain alkyl ester of acrylic or methacrylic acid (co-mer A) with an acrylic or methacrylic acid ester (co-mer B) of a polyalkyleneglycol group —$ZXR^{10}$ as defined above. The unsaturated acid of the co-mers A and B may be the same or different. As implied above it is not critical whether the ester group —$ZXR^{10}$ is attached to the acid residue of a monocarboxylic or dicarboxylic acid, as long as there is at least one long chain alkyl group present in one of the co-mers; it is even possible to form a mixed ester of a dibasic acid having both the non-polar group and the —$XR^{10}$ group attached to one acid molecule.

Optionally our copolymers may comprise copolymerisable mer-units other than those defined in Formulae A and B e.g. ethyl acrylate, methyl methacrylate, ethyl methacrylate, propyl methacrylate, propyl acrylate, vinyl acetate, acrylonitrile, $\alpha$-olefines including styrene, vinylidene chloride or even vinyl chloride, provided that they do not contain groups reacting with the polymerisable components of the foaming ingredients in sufficient quantity to chemically bind substantial proportions of our copolymers. Thus copolymers containing substantial proportions of active hydrogen groups are unsuitable because of their reaction with the vinyl ether group. Up to 30 mole percent of the total monomers forming the copolymeric additive may be derived from such co-mers C.

The polyoxyalkylene residues in our copolymers may be linear or branched and comprise —$(OC_mH_{2m})_q$— units, where $q$ is a positive integer, preferably greater than 5, and $m$ is an integer from 1 to 5, preferably 2 to 4. It is, of course, possible and in some cases may be desirable that $m$ should have different values in the same block. Alkylene groups which may be present include, for example, ethylene, 1,2-propylene, 1,3-propylene, 1,2-butylene and 1,4-butylene. The end of the polyoxyalkylene blocks is formed by the alkylene-oxide-reactive group $R^{10}$. These polyoxyalkylene blocks may be derived from polyoxyalkylene polymers prepared in known manner.

In the case of linear polyoxyalkylene residues Z equals —$(OC_mH_{2m})_q$—. Suitable linear hydroxy-containing polyoxyalkylene polymers may be prepared, for example, by the polymerisation of an alkylene oxide in the presence of a basic catalyst, such as potassium hydroxide, on to a polymer of an unsaturated mono- or di-carboxylic acid or its derivative bearing a group capable of reacting with alkylene oxide, e.g. a carboxyl, a hydroxyl or primary or secondary amine group. Alternatively branched hydroxy-containing polymers containing more than one residue Z may be prepared by the condensation of an alkylene oxide in the presence of a basic catalyst on to a polymer containing co-mer units bearing more than one active hydrogen atom per co-mer unit, e.g. copolymers bearing primary amino and/or polyhydroxy groups such as those derived from ammonia, glycerol, hexanetriol, triethanolamine, pentaerythritol, sorbitol, sucrose and phenol-formaldehyde reaction products, amino-alcohols such as monoethanolamine and diethanolamine and polyamines such as ethylene diamine, hexamethylene diamine, diethylene triamine, tolylene diamine and diaminodiphenylmethane. With branched polymers of this type it is preferred that each group Z is terminated by a group $R^{10}$ as defined.

Examples of groups $ZXR^{10}$ are the following compounds containing one hydroxy group. The monomethyl, ethyl, butyl, phenyl ethers of ethylene, diethylene, triethylene or propylene glycols; aminoalcohols such as the N:N-dimethyl, diethyl, phenylmethyl or phenylethyl derivatives of ethanolamine or isopropanolamine, or N-hydroxyethylmorpholine; or hydroxyalkyl esters and amides such as 2-hydroxyethyl benzoate, N-acetyl-N-methyl ethanolamine or N-benzoyl-N-methyl ethanolamine. Examples of monohydric polyether alcohols, which are in general mixtures of products of different molecular weights, include the products of oxyalkylation with ethylene, propylene and butylene oxides or with mixtures thereof, of monohydric alcohols or phenols, secondary amines, carboxylic acids and mono-N-substituted carboxylic amides. Some specific examples of such preferred monohydric polyether alcohols which have been found of value are listed in the folloming table:

and Zimmermann (Makromolekulare Chemie 1961, 58, 75).

| Initiator | Alkylene oxide | Molecular weights of derived polyethers |
|---|---|---|
| Methanol | Ethylene oxide | 365, 528, 750. |
| Mixed hexadecyl and octadecyl alcohols | do | 368.6. |
| Methyl Cellosolve | Propylene oxide | 354, 708. |
| Isooctanol (mixed isomers) | do | 292.4, 372, 419, 629, 980. |
| Triethylene glycol monomethyl ether | do | 608, 1,142. |
| Benzyl alcohol | do | 410. |
| Isooctanol (mixed isomers) | Butylene oxide (mixed isomers) | 281. |
| Methyl Cellosolve | do | 390. |
| n-Butanol | Mixture of ethylene and propylene oxides (1:1 by weight) | 332.7, 717, 1,510, 2,255. |
| Isooctanol (mixed isomers) | do | 600, 1,023, 1,529, 1,987. |
| Ethyl carbitol [1] | do | 1,023, 1,510, 2,010. |
| Butyl Cellosolve [1] | do | 1,483. |
| Butyl carbitol | do | 698. |
| Benzyl alcohol | do | 406. |
| N:N-diethylaminoethanol | do | 624, 1,135, 1,501. |
| Isooctanol (mixed isomers) | Mixture of ethylene and propylene oxides (1:2 by weight) | 1,493. |
| Ethyl carbitol | | 1,533. |
| Isooctanol (mixed isomers) | Mixture of ethylene and propylene oxides (2:1 by weight) | 1,541. |
| Ethyl carbitol | | 1,509. |

[1] Registered trademark.

Examples of branched polyoxyalkylene residues are trihydric polyethers of molecular weights up to about 10,000 obtained by oxyalkylation of glycerol, trimethylolpropane, 1:2:6-hexanetriol or pentaerythritol with ethylene oxide, propylene oxide or mixtures of ethylene and propylene oxides; oxyalkylation products from polyhydric phenols such as hydroquinone, resorcinol, 2:2-bis(4-hydroxyphenyl) propane or phloroglucinol; oxypropylated tolylenediamine of molecular weight about 400; oxyalkylated alkylenediamines where preferably all free hydroxy groups are terminated by $R^{10}$ groups.

The preparation of the copolymers of this invention by methods known "per se" will be apparent to those skilled in the art. Thus, in general two processes of manufacture may be used. One, applicable to many of our compounds, comprises copolymerising a compound of Formula A with a compound of Formula B. The methods of polymerisation, e.g. emulsion or solution polymerisation by a free radical mechanism or a cationic or anionic catalyst are also known from the prior art; the preferred and most convenient method depends on the specific co-mers selected. It is also known that certain mer-units A and B do not copolymerise readily or do so only at low rates. In these cases the difficulty may sometimes be overcome by copolymerisation with a third more readily polymerisable co-mer. Alternatively the second, generally preferable and more convenient process may be used, which comprises copolymerising precursors of the mer-units A and/or B which have reactive groups to form an intermediate copolymer to said reactive groups of which the desired non-polar component $R^1$ and/or the —$ZXR^{10}$ group or groups may be attached by subsequent reactions. Thus e.g, one may first copolymerise a given compound having a non-polar substituent $R^1$ such as an alkyl methacrylate with a suitable acid component such as itaconic acid or maleic anhydride; the resulting polymer is then reacted with a polyalkylene glycol whereby a portion or all of the free —COOH groups in the polymer intermediate become monoester-linked to the polyalkylene glycol. Other possible variations in the nature of the reactants and in the selection of a suitable reaction path would also suggest themselves to those skilled in the art.

Optionally polyvinyl ester or poly(alkyl acrylate) blocks or poly(alkyl methacrylate) blocks may be grafted on to the polyoxyalkylene blocks of our compounds. This may be accomplished by heating a polyoxyalkylene copolymer with a vinyl ester in the presence of a free radical producing catalyst, such as a peroxide, for example a diacyl or diaroyl peroxide, particularly dibenzoyl peroxide or an azo compound, particularly azodi-isobutyronitrile in the manner described by Kahrs It is preferred to carry out the polyoxyalkylation reaction in the presence of a catalyst of the type described in the prior art as effective in this general type of reaction, for example bases, acids, Friedel-Crafts halides, or metallic salts and complexes.

Particularly active catalysts are strong alkalis, especially alkali metal alkoxides such as sodium or potassium methoxide, or an alkali metal derivative of the monohydric alcohol which it is desired to react. Such alkali metal alkoxide catalysts are not, however, always completely satisfactory. This is particularly apparent when making block copolymers from hydrophilic polyesters of high molecular weight of the order of 1500 or higher. In such cases it is difficult, if not impossible, to obtain a homogeneous, single-phase product by the use of an alkoxide catalyst, and the mixture of products so obtained is usually ineffective as a surface-active additive for making foams. It has been found that these difficulties may be avoided by using as catalysts certain metal salts, especially metal salts which are soluble in the reaction medium, such as carboxylic acid salts of divalent tin or lead, or of dialkyl tin. Examples of particularly suitable catalysts are stannous octoate, lead octoate and dibutyl tin dilaurate. The use of these preferred catalysts enables the preparation, without difficulty, of homogeneous condensates which are extremely active as surface-active additives for the manufacture of the foams of this invention. Furthermore, even in those cases where it is possible to make a homogeneous product by use of an alkoxide catalyst, it is frequently found that the use of the aforedescribed metal salt catalysts provides products which are more active, or more reproducible in their properties as additives for these foams, than similar compositions made with an alkoxide catalyst.

The catalysts are normally used in proportions of from 0.05 to 1.0% by weight of the total weight of reactants, although proportions outside this range may be used.

The reaction is normally carried out at temperatures of from 20° C. to 140° C., depending mainly on the catalyst used. It is usually convenient to carry out the reaction in a solvent, for example an aromatic hydrocarbon or a chlorinated aromatic hydrocarbon.

Certain of the copolymers of this invention are new compounds. Our compounds have been found to be particularly valuable as additives in the manufacture of the foams described in Australian patent applications Nos. 29,882/63, 50,102/64, 52,625/64, 53,222/64, 60,435/65, 62,270/65, 45,417/64, 57,261/65, 58,347/65, 53,466/64, 57,775/65, 54,368/65, 60,736/65 and 61,091/65.

In Australian patent application No. 29,882/63 the foaming compositions to which our copolymers are added are defined as "a foaming composition comprising at least one polymerisable vinyl ether containing at least two vinyl groups per molecule, a foaming agent and an acidic catalyst"; particularly suitable vinyl ethers defined in said application (claim 7) have the generic formulae:

(1) 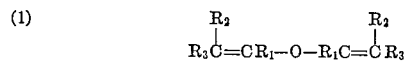

(2) 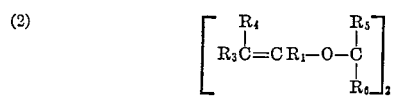

or (3) 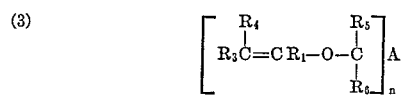

In Australian patent application No. 62,270/65 further suitable foaming compositions are defined as "a foamable composition comprising at least one polymerizable vinyl ether containing dihydropyranyl groups linked by ester groups, at least one polymerizable vinyl ether constituted by the aldol condensation product of a dihydropyran carboxyaldehyde, a foaming agent and a catalyst" and particularly suitable are e.g. the compositions of claims 3 and 4 namely "a foamable composition comprising 3,4-dihydro-2H-pyran - 2 - methyl-(3,4-dihydro-2H-pyran-2-carboxylate), the trimeric aldol condensation product of 2-formyl-3,4-dihydro-2H-pyran, a foaming agent and a catalyst" and "a foamable composition comprising 3,4-dihydro-2H-pyran - 2 - methyl-(3,4-dihydro-2H-pyran-2-carboxylate), the trimeric aldol condensation product of 2-formyl-3,4-dihydro-2H-pyran, at least one material reactive with vinyl ethers, a foaming agent and a catalyst."

In the foams defined in the above-listed patent applications, the additives of our invention confer an exceptional degree of stability on the foaming mass prior to the cure of the foam. Thus the use of our additives enables low density foams with an excellent, uniform pore structure to be obtained, and in some systems increases the proportion of closed cells in the foam.

As a further feature of the present invention there is provided a process for the manufacture of foamed cellular materials as defined above comprising polymerising said polymerisable compounds in the presence of a copolymer of the present invention.

A particularly useful property of our copolymers is that they are stable in presence of the foaming ingredients and that they do not hydrolyse on storage by themselves or after admixture to said foaming ingredients. This is of considerable commercial value as storage life is virtually indefinite and timing of the addition of the pore size control agent is no longer critical, so that the wastage of premixed materials, which may be incurred with silicones whenever there are plant shut-downs or delays in processing, is avoided. A further advantage is that the moisture transmission through the resulting foams is lower than when they are produced with silicones.

The copolymers may be incorporated into the foam-forming mixture as such, or may first be mixed with any of the foam-forming ingredients with which they are not reactive and in which they are soluble for example the vinyl ether. The copolymers are normally incorporated in amounts of from 0.1% to 5%, preferably from 0.1% to 1% by weight of the weight of the vinyl ether component.

The invention is illustrated but not limited by the following examples in which parts and percentages are by weight.

Example 1

A mixture of 395 parts of light petroleum B.P. 100–120° C. and 395 parts of toluene was stirred and heated under reflux. A solution of 2.5 parts benzoyl peroxide in 8.5 parts butyl methacrylate, 102 parts stearyl methacrylate and 123 parts of the methacrylate of methoxy- polyethyleneglycol of molecular weight 320 was added over a period of 5 hours to the refluxing solvent. 0.3 part of benzoyl peroxide was then added, and further quantities of 0.3 part were added after 2 hours and 5 hours respectively. Heating was continued for a further 3 hours. The solvents were removed under reduced pressure. There was thus obtained a copolymer of the composition indicated in Table I.

Example 2

135 parts of stearyl methacrylate, 82 parts of the methacrylate of methoxypolyethyleneglycol of molecular weight 320, and 28.4 parts of butyl methacrylate were copolymerised in the presence of 3.3 parts of benzoyl peroxide under operating conditions similar to those used for making the polymer of Example 1 but only two additions of benzoyl peroxide, each of 0.3 part were made. The solvents were again stripped from the polymer under reduced pressure. There was thus obtained a copolymer of the composition indicated in Table I.

Example 3

A solvent free copolymer of 67.5 parts of stearyl methacrylate, 28.4 parts of butyl methacrylate and 164 parts of the methacrylate of methoxypolyethyleneglycol of molecular weight 320 was prepared as described in Example 1. There was thus obtained a copolymer of the composition indicated in Table I.

Example 4

94 parts of the methoxypolyethyleneglycol methacrylate described above, 94 parts of lauryl methacrylate and 15 parts of ethyl acrylate were copolymerised with the aid of 4 parts of benzoyl peroxide as described in Example 3. The addition of monomers again took 5 hours but no further peroxide was added and heating was continued for a further 10 hours. There was thus obtained a copolymer of the composition indicated in Table I.

Example 5

100 parts of 2-ethylhexyl acrylate, 10 parts of ethyl acrylate, 100 parts of the polyethyleneglycol methacrylate used in Example 1 and 4 parts of benzoyl peroxide were added over 5 hours to a refluxing mixture of equal parts by weight of toluene and light petroleum, B.P. 100–120° C. as in Example 1. There was thus obtained a copolymer of the composition indicated in Table I.

Example 6

100 parts of the polyethyleneglycol methacrylate used for making polymer A, 100 parts of butyl acrylate and 10 parts of ethyl acrylate were copolymerised as in Example 3. There was thus obtained a copolymer of the composition indicated in Table I.

Example 7

A mixture of 60 parts of the methacrylate of methoxy-terminated polyethyleneglycol referred to in Example 1, 50 parts of ethyl acrylate and 4 of benzoyl peroxide was added at a constant rate over a period of 5 hours to a stirred, refluxing mixture of 300 parts toluene and 100 parts of light petroleum (boiling point 100–120° C.). Heating under reflux was continued for a further 10 hours. A solvent-free polymer of the composition given in Table I was then obtained as described in Example 1.

Example 8

A solution of 50 parts of the methacrylate of methoxy-terminated polyethylene glycol referred to in Example 1 and 2 parts of benzoyl peroxide in 220 parts of toluene was heated under reflux for 17 hours. Additions of 0.5 part benzoyl peroxide were made 1.5, 2.5 and 4 hours respectively from the time of commencing reflux. The solvent free homopolymer was obtained as described in Example 1.

Example 9

A mixture of 212 parts of the fumaric acid diester of methoxy terminated polyethyleneglycol of molecular weight 320, 127 parts of lauryl methacrylate, 6 parts of benzoyl peroxide and 100 parts of toluene was added at a uniform rate over a period of 4 hours to a mixture of 200 parts benzene and 400 parts of toluene which was heated and stirred under reflux. The reaction was allowed to continue for 54 hours when 2 parts of benzoyl peroxide were added and heating under reflux was continued for a further 24 hours. The solvents were removed under reduced pressure. There was thus obtained a copolymer of the composition indicated in Table I.

Example 10

The procedure of Example 1 was repeated except that 0.65 part of butan-1:3-diol dimethacrylate were included in the mixture of monomers polymerised. The resulting copolymer obtained by evaporation of the solvent was slightly cross-linked and had the composition given in Table I.

Example 11

50 parts of the copolymer from Example 2 were stirred and heated at 80° C. under nitrogen whilst 40 parts of freshly distilled vinyl acetate containing 0.6 part of benzoyl peroxide were added dropwise over a period of 30 minutes. Stirring and heating to 90–100° C. under reflux were the continued for 3 hours. The mixture was allowed to cool to 20° C. after which all matter volatile up to 100° C. at 0.1 mm. pressure was removed by distillation. There was thus obtained 85.7 parts of a homogeneous clear oil that set to a waxy solid on cooling.

Example 14

A soluiton of 53.5 parts of the methacrylate of methoxy polyethylene glycol of molecular weight 1300 (hereinafter referred to as polymer O) and 2 parts benzoyl peroxide in 46.5 parts butyl acrylate, 80 parts of butanol and 25 parts of "Cellosolve" acetate (registered trademark) was added at a uniform rate during 5 hours to a stirred refluxing mixture of 200 parts butanol and 95 parts "Cellosolve" acetate. Then one further part of benzoyl peroxide was added and the heating under reflux was continued for another 11 hours. The solvents were removed under reduced pressure.

Example 15

A solution of 42 parts of polymer O and 2 parts of benzoyl peroxide in 37.2 parts of ethyl acrylate, 80 parts of butanol and 70 parts of Cellosolve acetate was added at a uniform rate over a period of 5 hours to a stirred refluxing mixture of 160 parts butanol and 95 parts of Cellosolve acetate. A further 1.5 parts of benzoyl peroxide was added 1.5 hours after the monomer feed was completed and heating under reflux was continued for 7 hours; total reaction time was 13.5 hours. The polymeric stabiliser was freed of solvent as described above.

Example 16

A solution of 61 parts of polymer O, 41 parts of stearyl methacrylate and 2 parts benzoyl peroxide in 100 parts of Cellosolve acetate, 10 parts of butanol, 20 parts of toluene and 20 parts of petroleum ether (B.P. 100–120° C.) was added at a uniform rate over one hour to 200 parts of butanol stirred and heated under reflux. Three

TABLE I

| Monomer | Example number | | | | | | | | | |
|---|---|---|---|---|---|---|---|---|---|---|
| | 1 | 2 | 3 | 4 | 5 | 6 | 7 | 8 | 9 | 10 |
| | Molar proportion of monomer | | | | | | | | | |
| Butyl methacrylate | 0.06 | 0.2 | 0.2 | | | | | | | 0.06 |
| Stearyl methacrylate | 0.3 | 0.4 | 0.2 | | | | | | | 0.3 |
| Methoxypolyethyleneglycol (M.W. 320) ester of methacrylic acid | 0.3 | 0.2 | 0.4 | 0.23 | 0.24 | 0.24 | 0.145 | 1 homopolymer | | 0.3 |
| Ethyl acrylate | | | | 0.15 | 0.1 | 0.1 | 0.5 | | | |
| Lauryl methacrylate | | | | 0.37 | | | | | 0.50 | |
| 2-ethylhexyl acrylate | | | | | 0.54 | | | | | |
| Methoxypolyethyleneglycol (M.W. 320) diester of fumaric acid | | | | | | | | | 0.29 | |
| Butyl acrylate | | | | | | 0.78 | | | | |
| Butan-1:3-diol dimethacrylate | | | | | | | | | | 0.003 |

Example 12

A solution of 53 parts of di-n-octyl itaconate, 75 parts of the itaconate diester of methoxy-polyethylene glycol of molecular weight 320 and 1 part of azobisisobutyronitrile in 200 parts of benzene was heated under reflux with stirring. Additions of 1 part of azobisisobutyronitrile each were made after periods of 6, 24, 48 and 72 hours respectively from the start of the experiment; the total period of heating under reflux was 96 hours. The solvent was stripped from the solution by distillation under reduced pressure.

Example 13

A solution of 1 part of azobisisobutyronitrile in 66 parts of 2-ethoxyethyl methacrylate and 42 parts of lauryl methacrylate was added dropwise over a period of one hour to a stirred mixture of 100 parts of benzene and 100 parts of toluene heated under reflux. Heating and stirring were continued for a further 19 hours when a determination of the solids content of the solution showed that the polymerisation had gone beyond 95% completion. The solvent-free copolymer was obtained as described above.

hours after the addition was complete 1 part of benzoyl peroxide was added, and heating under reflux was continued for a further 16 hours. Solvent was then stripped from the polymer as described above.

Example 17

A solution of 61 parts of polymer O, 39 parts of lauryl methacrylate and 2.5 parts of benzoyl peroxide in 100 parts of Cellosolve acetate, 10 parts of butanol, 20 parts of toluene and 20 parts of petroleum ether was added at a uniform rate over a period of one hour to 200 parts of butanol stirred and heated under reflux. One part of benzoyl peroxide was added 3 hours after the original feed had finished and heating under reflux was continued for a further 16 hours. The polymer was obtained free of solvent as described in the earlier examples.

Example 18

3.5 mole of ethylene oxide and 2.5 mole of propylene oxide were mixed and condensed on to 1 mole of n-butanol in the presence of sodium hydroxide catalyst, and the resulting polyether alcohol was converted to its methacrylate ester by the process of Example No. 7 of U.S. patent specification No. 2,815,396. 63 parts of this methacrylate, 32.4 parts of stearyl acrylate, 4 parts of ethyl acrylate and 2 parts of benzoyl peroxide were mixed to form a homogeneous solution, and the resulting mixture added at a constant rate over 4 hours to a stirred refluxing mixture of 200 parts of toluene and 200 parts of petroleum ether (B.P. 100–120° C.). One further part of benzoyl peroxide was then added and heating under reflux was continued for 16 hours. Determination of the solids content of the resulting solution showed that a 95% yield of polymer had been obtained. The solvent-free polymer was then isolated as above described.

Example 19

A solution of 2.5 parts of benzoyl peroxide in 61 parts of the methacrylate of methoxypolyethyleneglycol of molecular weight 320, and 41 parts of lauryl methacrylate in a mixture of 20 parts of toluene, 20 parts of petroleum ether (B.P. 100–120° C.), 15 parts of butyl acetate and 15 parts of butanol was added at a uniform rate over a period of one hour to a stirred refluxing mixture of 100 parts of petroleum ether (B.P. 100–120° C.) and 100 parts of toluene. 3 hours after the addition had been completed, 1 part of benzoyl peroxide was added and the heating under reflux continued for 16 hours. The polymeric stabiliser was obtained solvent-free in the manner described in earlier examples.

Example 20

A solution of 2.5 parts benzoyl peroxide, 71 parts of the methacrylate of methoxypolyethyleneglycol of molecular weight 320, and 42 parts of stearyl methacrylate in 50 parts of toluene and 20 parts of petroleum ether (B.P. 100–120° C.) and 10 parts of butanol was added over a period of one hour to a mixture of 100 parts of toluene and 100 parts of petroleum ether (B.P. 100–120° C.) stirred and heated under reflux. An addition of benzoyl peroxide was made and the polymerisation was completed as described in Example 19.

Example 21

130 parts of itaconic acid, 260 parts of methoxypolyethyleneglycol of molecular weight 320, 192 parts of n-octanol, 15 parts of para-toluenesulphonic acid and 1500 parts of toluene were charged into glass reaction vessel fitted with a stirrer, Dean and Stark trap and condenser. The reactants were heated and stirred under reflux for 36 hours; the water formed in the esterification was removed by means of the Dean and Stark apparatus. The contents of the reactor were allowed to cool to ambient temperature and washed in turn with 100 parts of 50% (w./w.) aqueous sodium hydroxide solution, and with 2 portions each of 200 parts of a saturated solution of sodium chloride in water. The resulting solution was stirred with anhydrous sodium sulphate, decanted from the solid, and freed of toluene by distillation under reduced pressure to yield the mixed ester as a viscous liquid.

A solution of 100 parts of this mixed itaconate ester and 2 parts azobisisobutyronitrile in 200 parts of benzene was heated under reflux. Additions of 1 part of azobisisobutyronitrile each were made at 4, 8, 24, 28, 32, 48, 52 and 56 hours respectively after the start of the experiment; the total time of heating the mixture was 72 hours. The solvent-free polymer was then obtained as described in the earlier examples.

Example 22

A solution of 52 parts of di-Cellosolve fumarate, 51 parts of lauryl methacrylate and 1 part of azobisisobutyronitrile in 100 parts of toluene and 100 parts of petroleum ether (B.P. 100–120° C.) was heated under reflux. Additions, each of 0.5 part of azobisisobutyronitrile were made 2, 4, 6, 8, 10 and 23 hours respectively after the start of the polymerisation, the total reaction time being 26 hours. The resulting solution was heated (up to 120° C.) under reduced pressure (0.05 mm. mercury) to give a high yield of the copolymer.

Example 23

A suspension of 71.5 parts of itaconic acid in 500 parts of toluene cotaining 5 parts of p-toluenesulphonic acid was esterified with a mixture of 178 parts of lauryl alcohol and 178 parts of methoxypolyethyleneglycol of molecular weight 1300 as described in Example 21.

A solution of 100 parts of this mixed ester and 2 parts of azobisisobutyronitrile in 200 pars of benzene was heated under reflux with stirring. Additions of 1 part of azobisisobutyronitrile were made in Example 12 and again the total period of heating under reflux was 96 hours. The polymeric product was obtained solvent-free as described in the earlier examples.

Example 24

A mixture of 11.2 parts of itaconic anhydride, 26.9 parts of dinonylamine and 150 parts of toluene was warmed at about 50° C. for 10 minutes in a glass reactor fitted with a stirrer and reflux condenser. Then 27 parts of stearyl alcohol and 1 part of paratoluenesulphonic acid were added and the reactor was fitted with a Dean and Stark apparatus. Stirring and heating under reflux were resumed and continued for 2 hours with continuous removal of the water of reaction via the Dean and Stark apparatus. The contents of the reactor were cooled to ambient temperature, washed in succession with 20 parts of 10% w./w. aqueous sodium hydroxide solution, 20 parts of water, and 2 portions each of 25 parts of saturated aqueous sodium chloride solution. The toluene was removed from the esteramide by distillation under reduced pressure.

A solution of 50 parts of this esteramide, 1 part of azobisisobutyronitrile and 50 parts of the itaconic acid diester of methoxypolyethyleneglycol of molecular weight 320 in 200 parts of benzene was heated under reflux with stirring. Additions of 1 part of azobisisobutyronitrile each were made 4, 8, 24, 28, 32, 48, 52 and 56 hours respectively after the start of the experiment; the total time of heating the mixture was 72 hours. The solvent-free polymeric pore size control agent was obtained as described in the earlier experiments.

Example 25

A mixture of 154 parts of ethylene oxide and 145 parts propylene oxide was condensed on to 74 parts of n-butanol in the presence of sodium hydroxide catalyst. A glass reactor fitted with a Dean and Stark apparatus, reflux condenser and stirrer was used for the next part of the experiment. 65 parts of itaconic acid, 93 parts of the polyether alcohol described above in this example, 139.5 parts of lauryl alcohol, 10 parts of para-toluenesulphonic acid and 1500 parts of toluene were charged into the reactor and heated and stirred under reflux for 14 hours with continuous removal of water via the Dean and Stark apparatus. The contents of the reactor were allowed to cool, washed with 50 parts of a 50% w./w. solution of caustic soda, 100 parts of saturated brine, and then allowed to stand over 100 parts of anhydrous sodium sulphate. The resulting solution was decanted from the solid, and the ester product was obtained after the toluene had been removed under reduced pressure.

A solution of 100 parts of this mixed itaconic acid ester and 2 parts of azobisisobutyronitrile in 200 parts of benzene was heated under reflux. The polymerisation was completed and additions of azobisisobutyronitrile were made as in Example 21. 50 parts of this polymer of the mixed itaconic acid ester were stirred and heated at 80° C. under nitrogen whilst a solution of 0.5 part of benzoyl peroxide in 30 parts of Cellosolve methacrylate and 5 parts of methyl methacrylate was added dropwise over a period of 30 minutes. Stirring and heating to 90–100° C. under reflux were then continued for 3 hours. The mixture was allowed to cool to 20° C. after which all matter volatile up to 100° C. at 0.1 mm. mercury pressure was removed by distillation. There was thus obtained 80 parts of a homogeneous clear oil that set to a waxy solid on cooling.

Example 26

A solution of 1.5 parts of benzoyl peroxide and 67 parts of the acrylate of the alcohol formed by condensing nine moles of ethylene oxide on to 1 mole of para-nonylphenol in 14 parts of butyl acrylate, 75 parts of benzene and 75 parts of toluene was stirred and heated under reflux. Portions of 0.5 part of benzoyl peroxide were added 2 and 4 hours respectively after the start of the polymerisation, which was allowed to proceed for a total of 6 hours. The solvents were removed under reduced pressure as in earlier examples.

Examples 27 to 84 inclusive

The polymerisable foaming components A, B, C, D, E and F used in Examples 27 to 84 inclusive are defined as follows:

A is 3,4-dihydro-2H-pyran-2-methyl-(3,4-dihydro-2H-pyran-2-carboxylate).

B is the aldol condensation product formed when concentrated aqueous sodium hydroxide solution is added to a 77% v./v. solution of 2-formyl-3,4-dihydro-2H-pyran in trichloromonofluoromethane as described in Australian patent application No. 62,270/65.

C consists of a mixture of 90 parts of A, 69 parts of B, 31 parts of trichlorofluoromethane and 10 parts of bisphenol A.

D is a blend of 19.5 parts of castor oil with 6.5 parts of "Dowicide 7" (registered trademark, Dow Chemical Co.), 13 parts of trichlorofluoromethane and 1.54 parts of boron trifluoride-diethyl etherate. D was allowed to age for a week in a sealed dark container before being used.

E is a mixture consisting of 50 parts of A, 12.5 parts of 2,2-bis-(4-hydroxyphenyl)-propane, 12.5 parts of trichloromonofluoromethane and 5 parts of the condensation product of equal molar proportions of 2-ethylhexanol and A.

Mixture F is a blend of 1.95 parts of castor oil, 0.65 part of "Dowicide 7" (registered trademark, Dow Chemical Co.), 7.9 parts of trichlorofluoromethane, 0.49 part of tris-($\beta$-chloroethyl) phosphate and 0.90 part of boron trifluoride-diethyl etherate. F was aged for a week before use in the same way as was D.

Example 27

One part of the polymeric stabiliser prepared in Example 1 was dissolved in 400 parts of mixture C with warming and gentle stirring, precautions being taken to prevent loss of trichlorofluoromethane. The resulting mixture was stirred vigorously at room temperature while 80 parts of D were poured in rapidly; the stirring was continued for 10 seconds and the mixture then poured immediately into an open mould. Within 5 seconds the liquid began to expand and in a further 15 seconds formed a rigid foam. The foam consisted of uniformly small cells; a very high proportion of the cells was closed. The core of the foam was light brown, and the skin friable where it was in contact with air.

Examples 28–52 inclusive

In Examples 28 to 52 inclusive the foam preparation was repeated as in Example 27 except that 1 part of each of the polymers from Examples 2–26 inclusive respectively was used instead of the polymer from Example 1. Except for Examples 33, 34 and 41 in which the polymers from Examples 7, 8 and 15 respectively had been used the foam had the same uniform pore structure and other characteristics as the foam described in Example 27. The foams of Examples 33, 34 and 41 had non-uniform cell structure, included voids and were generally unsatisfactory.

Examples 53–55 inclusive

The foam preparation of Example 27 was repeated except that instead of the polymer as described in Example 27, commercially available surfactants of the siloxane-oxyalkylene-copolymer type, namely "Silicone DC–201" (Dow Corning), "Silicone L–520" (Union Carbide) and "Silcocel 380" (ICI) (all registered trademarks) were used for Examples 53–55 respectively.

The foams made with the polymeric surfactants of this invention, excluding the copolymers of Examples 7 and 8 and 15, were in every way comparable with those made with the siloxane-type surfactants of the prior art exemplified by Examples 53 to 55 inclusive.

Example 56

0.3 part of the polymer from Example 1 were dissolved in 80 parts of mixture E, with warming and stirring; precautions were taken to prevent loss of trichlorofluoromethane. The resulting solution was stirred vigorously at room temperature while 12 parts of F were rapidly added. Stirring was continued for 10 seconds after which the mix was immediately poured into an open mould. Within 5 seconds the liquid began to expand, and in a further 15 seconds it formed a rigid foam. The core of the foam was light brown and the skin friable where it was in contact with air. The foam consisted of uniformly small cells. A high proportion of the cells was closed.

Examples 57–81 inclusive

The foaming compositions were made up as for Examples 56 except that the polymer of Example 1 was replaced with 0.3 part by weight of each of the polymers of Examples 2–26 inclusive respectively. Again the foams made with polymers from Examples 7, 8 and 15 i.e. the foams of Examples 62, 63 and 70 respectively, were unsatisfactory as in the case of the foams of Examples 33, 34 and 41. The remaining foams of this series were comparable in all respects with that made by the process described in Example 56.

Examples 82–84 inclusive

The foam preparation of Example 56 was repeated except that the polymer as described in Example 1 was replaced with a commercially available surfactant of the siloxane oxyalkylene copolymer type; "Silicone DC–201" (Dow Corning). "Silicone L–520" (Union Carbide) and "Silcocel 380" (ICI) (all registered trademarks) were used for Examples 82–84 inclusive respectively.

With the exception of Examples 62, 63 and 70, the foams of Examples 57 to 81 inclusive were in every way comparable to those made with the siloxane-type surfactants of Examples 82 to 84 inclusive, which are representative of the prior art.

Example 85

A solution of 36.5 parts of the diester of methoxypolyethylene glycol (molecular weight 320) with fumaric acid in a mixture of 100 parts toluene and 100 parts methyl ethyl ketone was heated and stirred under reflux. A solution of 31 parts of vinyl stearate, 8.6 parts of vinyl acetate and 1 part of azobisisobutyronitrile in 50 parts of methyl ethyl ketone was added at a uniform rate over a period of four hours to the above solution heated under reflux. When the addition was complete further 0.2 part of azobisisobutyronitrile were added to the reaction mixture and heating and stirring under reflux were continued for a further four hours. The solvent-free polymer was then isolated by the procedure described in Example 1.

Example 86

800 parts of propylene oxide were condensed onto 190 parts of 2-ethoxyethanol in the presence of sodium hydroxide catalyst and the resulting polyether alcohol was converted to its methacrylate ester by the process of Example 7 of U.S. patent specification No. 2,815,369. A solution of 132.5 parts of this methacrylate ester and 3 parts of benzoyl peroxide in 71 parts of butyl methacrylate and 6 parts of dodecyl mercaptan was added at a uniform rate over a 1.5 hours period to 620 parts of isopropanol which was heated and stirred under reflux throughout this period. When this addition was complete, 0.2 part of benzoyl peroxide were added and heating and stirring under reflux was continued for 10 hours with further quantities of 0.2 part of benzoyl peroxide being introduced at 2.5 hourly intervals. The solvent-free polymer was then obtained as in Example 1.

Example 87

A copolymer of 159 parts of the polyether methacrylate described in Example 57, 101.4 parts of stearyl methacrylate and 7.6 parts of butyl acrylate was prepared by the process described in Example 1.

Example 88

The process of Example 36 was repeated except that only 43 parts of the methacrylate of the polyether alcohol were used in making the copolymer; the quantities of the other reactants remained unchanged. The polymer was isolated as described in Example 36.

Example 89

A solution of 33 parts of allyl lauryl prop-2-enylphosphonate and 30.3 parts of the methacrylate of diethylene glycol monoethyl ether in 60 parts of beta, beta'-dichlorodiethyl ether containing 1.5 parts of di-tertbutyl peroxide was heated for 8 hours at 150° C. Additions of 0.5 part of the peroxide to the reaction mixture were made at 2 hourly intervals. The solvent-free polymer was obtained as in Example 1.

Example 90

A solution of 3.6 parts of azobisisobutyronitrile in 170.4 parts of isobutyl methacrylate and 193 parts of the methacrylate of methoxypolyethylene glycol of molecular weight 320 was added at a uniform rate over a period of 2.5 hours to a mixture of 500 parts of toluene and 500 parts of light petroleum B.P. 100–120° C. being heated under reflux. Portions of 0.5 and 0.2 part of azobisisobutyronitrile were added 5 hours and 7 hours respectively from the start of the experiment.

The heating under reflux was maintained for 24 hours in all. The solvent-free polymer was obtained as in Example 1.

Examples 91–102 inclusive

In Examples 91–96 inclusive the foam preparation was repeated as in Example 27 except that 1 part of each of the polymers from Examples 85–90 inclusive respectively was used instead of the polymer from Example 1.

The foams had a fine uniform cell structure, and were in every way comparable with those made with the siloxane-type surfactants of the prior art as exemplified by Examples 53, 54 and 55.

Similarly, for Examples 97–102 inclusive, the foam preparation of Example 56 was repeated except that the polymer of Example 1 was replaced with the polymers of Examples 85–90 inclusive respectively. The foams had a fine uniform cell structure and were in every way comparable with the foams made with the siloxane-type surfactants of the prior art as exemplified by Examples 82, 83 and 84.

I claim:

1. In a process of foaming a vinyl ether foaming composition comprising at least one polymerizable cyclic vinyl ether containing at least two vinyl groups per molecule, a foaming agent and an acidic catalyst, the improvement comprising foaming said composition in the presence of a pore-size controlling additive comprising at least one copolymer of
   (1) at least one unsaturated compound A selected from the class consisting of esters and dialkylamides of acrylic, methacrylic, itaconic and crotonic acids and
   (2) at least one compound B selected from the class consisting of esters and dialkylamides of mono- and dicarboxylic unsaturated acids selected from the class consisting of acrylic, methacrylic, maleic, fumaric, citraconic and mesaconic acids,
   at least one of said compounds A and B carrying at least one aliphatic substituent having at least 4 carbon atoms and said compound B containing at least one polyoxyalkylene residue terminated with a radical selected from the class consisting of alkyl, aryl, aralkyl, alkaryl and acyl groups.

2. A process according to claim 1 wherein said aliphatic substituent is a long chain alkyl radical having at least 12 carbon atoms in the chain.

3. A process according to claim 2 wherein the weight of the long chain alkyl radical is between 10 and 60% of the total weight of the pore-size controlling additive.

4. A process according to claim 1 wherein the weight of the polyoxyalkylene residue is between 15 and 70% of the total weight of the pore-size controlling additive.

5. A process according to claim 1 wherein in addition to compounds A and B the pore-size controlling additive comprises at least one copolymerizable ethylenically unsaturated co-mer in an amount up to 30 mole percent of the total copolymer.

6. In a process of foaming a vinyl ether foaming composition comprising at least one polymerizable cyclic vinyl ether containing at least two vinyl groups per molecule, a foaming agent and an acidic catalyst the improvement comprising foaming said composition in the presence of a pore-size controlling additive comprising at least one copolymer of
   (1) a compound A selected from the class consisting of vinyl esters of an alkanoic acid and esters and dialkylamides of a monocarboxylic acid selected from the class consisting of acrylic and methacrylic acids and diesters, esterdialkylamides, tetraalkyldiamides and cyclic N-carboximides of itaconic acid;
   (2) a compound B selected from the class consisting of esters and dialkylamides of a monocarboxylic acid selected from the class consisting of acrylic and methacrylic acids and diesters, esterdialkylamides, tetraalkyldiamides and cyclic N-alkyl carboximides of a dicarboxylic acid selected from the class consisting of maleic, fumaric and itaconic acids;
   (3) a compound C selected from the class consisting of acrylic and methacrylic acids and vinyl esters of lower alkanoic acids having 2–4 carbon atoms,
   at least one of said compounds A and B carrying at least one alkyl group $R^1$ having at least 4 carbon atoms, said compound B carrying a substituent of the formula $-ZXR^{10}$ wherein Z is selected from the class consisting of linear or branched copolymer, random copolymer or block copolymer polyoxyalkylene residues, X is selected from the class consisting of $-O-$ and $NR^{18}$ wherein $R^{18}$ is a hydrocarbon radical and $R^{10}$ is selected from the class consisting of alkyl, cycloalkyl, aryl, alkaryl, aralkyl and acyl groups,
   the weight of said alkyl group $R^1$ being between 10 and 60% of the total weight of the pore-size controlling additive, the weight of Z in said polyoxyalkylene residue being between 15 and 70% of the weight of said pore-size controlling additive and the compound C being present in an amount up to 30 mole percent of the total copolymer.

7. A process according to claim 6 wherein said copolymer is present in amounts of 0.1 to 5 percent based on the weight of said vinyl ether.

References Cited
UNITED STATES PATENTS

| | | | |
|---|---|---|---|
| 3,247,289 | 4/1966 | Sears | 260—885 |
| 3,311,573 | 3/1967 | Graham et al. | 260—2.5 |
| 3,311,574 | 3/1967 | Graham | 260—2.5 |
| 3,311,575 | 3/1967 | Bowering et al. | 260—2.5 |

MURRAY TILLMAN, *Primary Examiner.*

M. FOELAK, *Assistant Examiner.*

U.S. Cl. X.R.

260—874, 901